(12) United States Patent
Leung

(10) Patent No.: US 6,206,281 B1
(45) Date of Patent: Mar. 27, 2001

(54) CALCULATOR WITH AUTOMATIC SLOW MOTION DEPLOYMENT

(75) Inventor: Chan Sik Leung, Kowloon (HK)

(73) Assignee: CCL Products Enterprises, Inc., Freeport, NY (US)

( * ) Notice: Subject to any disclaimer, the term of this patent is extended or adjusted under 35 U.S.C. 154(b) by 0 days.

(21) Appl. No.: 09/299,991

(22) Filed: Apr. 27, 1999

(51) Int. Cl.⁷ ................................. G06F 3/08; G06K 7/00
(52) U.S. Cl. ........................ 235/61 R; 235/435; 235/419
(58) Field of Search ..................... 174/55, 57, 59, 174/65 G, 67; 235/1 D, 61 A, 61 R, 62 D, 63 R, 58 M, 74, 432, 434, 435, 419, 375; 379/428, 433, 434, 440; D18/2, 7

(56) References Cited

U.S. PATENT DOCUMENTS

D. 424,604 * 5/2000 Leung ..................................... D18/7

* cited by examiner

*Primary Examiner*—Thien M. Le
*Assistant Examiner*—Larry D Taylor
(74) *Attorney, Agent, or Firm*—Allen R. Morganstern

(57) ABSTRACT

A decorative housing for an object such as calculator has a unique appearance that enhances its functionality. To reduce the desk area of the calculator when not in use, the calculator shrinks in size when in the closed position. The decorative housing opens in an automatic smooth slow motion kinetic deployment when ready to use. It includes a whimsical design with kinetic features that can amuse the user.

14 Claims, 5 Drawing Sheets

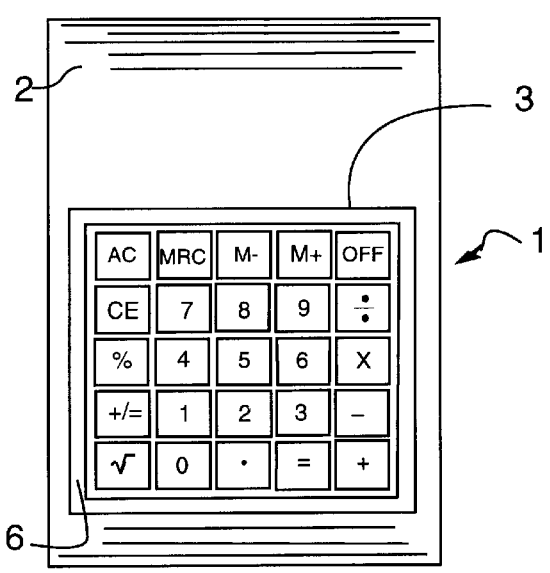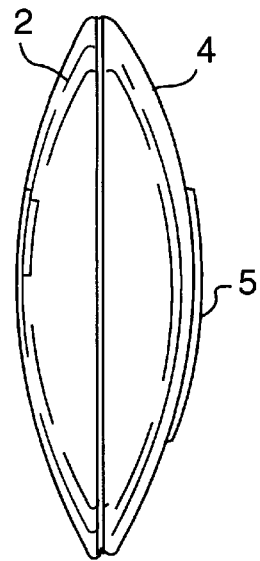
Fig. 1A　　　　　　　　Fig. 1B
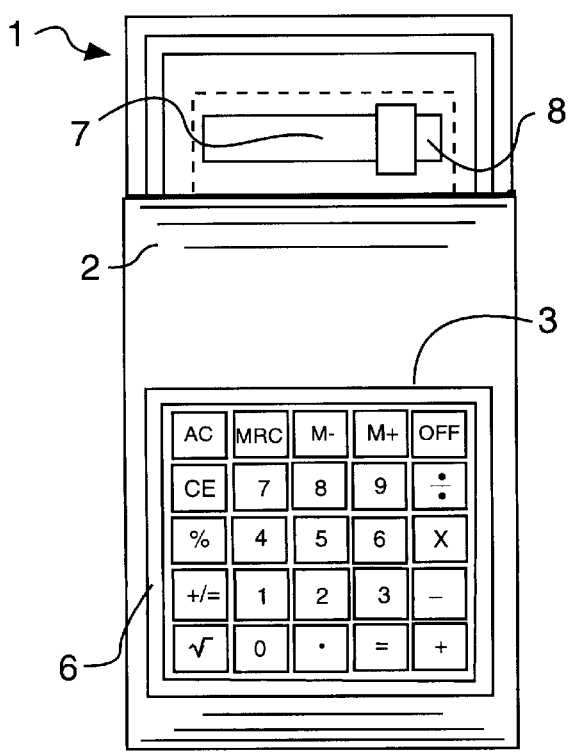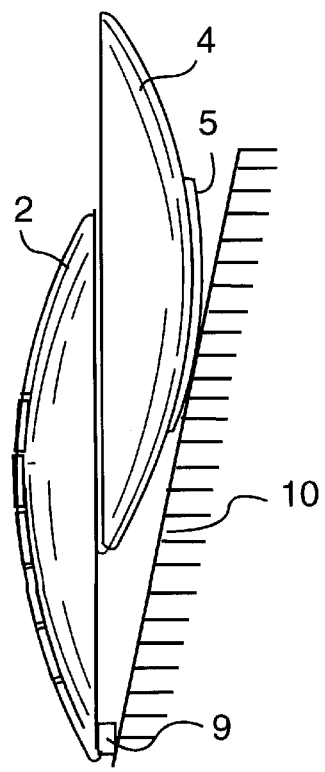
Fig. 2A　　　　　　　　Fig. 2B

CALCULATOR WITH AUTOMATIC SLOW MOTION DEPLOYMENT

FIELD OF THE INVENTION

The present invention relates to conveniently openable housings for calculators and the like.

BACKGROUND OF THE INVENTION

Calculators have become commodity appliances. Even "designer" versions have the familiar rectangular shape. Beyond functionality, ergonomic design dictates the use of large comfortable keys and a large display.

These features, however, normally result in a calculator with a larger "footprint" taking up valuable desk space. Because of their utilitarian appearance, calculators are seldom considered decorative items.

In addition, some calculator have a cover that must be physically separated from the calculator before viewing the calculator. Other calculators have no cover, which results in dust and other contaminants lodging upon the keyboard and liquid crystal display (LCD) viewing screen and interfering with clear viewing thereof.

OBJECTS OF THE INVENTION

It is therefore an object of this invention to provide a calculator with a unique appearance that enhances its functionality.

It is a further object of this invention to reduce the desk area of the calculator when not in use.

It is another object of this invention to provide automatic slow motion deployment of the calculator when ready to use.

It is also an object of this invention to provide a whimsical design with kinetic features that can amuse the user.

It is another object of this invention to reduce the desk area of the calculator when not in use.

It is yet another object of the present invention to provide a housing for storing objects therein, wherein the cover thereof opens in a slow, smooth aesthetically pleasing motion.

SUMMARY OF THE INVENTION

In keeping with these objects and others which may become apparent, the present invention includes a kinetic, decorative housing for useful articles, such as a calculator. However, the housing could also function as a small hollow jewelry box or the like for housing small personal articles therein.

The housing has a body with a longitudinally extending dimension. The body is divided along the longitudinal dimension into an upper part and a separate lower part.

The upper and lower parts each have respective outer surfaces and respective parallel mutually opposing inner surfaces in separable contact with one another. The inner surfaces respectively include a front portion terminating in a front edge and a rear portion terminating in a rear edge.

A pair of elongated pivoting members are located in parallel disposition relative to each other and the pivoting members each are rotatably connected within the upper and the lower parts.

One of the pivoting members is a driven member and the other pivoting member is a driver. The driver pivoting member is provided with spring means and motion damping means mounted to the driver pivoting member at the rotatable connection of the driver pivoting member with the lower part of the body of the decorative housing of the calculator.

The upper and lower parts are moveable with a slow gliding rotational motion about the pivoting rods, wherein accelerations are relatively small and velocity is relatively low and substantially constant through most of the travel of the upper and lower parts relative to each other.

This rotational motion includes a component of longitudinal displacement and a component of vertical displacement, wherein the rotational motion occurs between alternate open and closed positions of the decorative housing.

The opposing inner surfaces remaining parallel to each other during the rotational motion In the closed position the inner surface of the upper part covers substantially all of the inner surface of the lower part. However, in the open position the inner surface of the upper part covers less than substantially all of the inner surface of the lower part. A spring urges the upper and lower parts into the open position. The decorative housing for the calculator has a latch means for releasably latching the decorative housing for the calculator in the closed position.

The spring may be a torsion coil mounted in a drum, which has a hollow interior for accommodating the spring therein. The drum is mounted rotatably within a diameter-matching cylindrical bore at the lower end of the driver pivoting member. This bore has an inner surface and the drum has an outer surface in close proximity to the inner surface of the cylindrical bore.

The outer surface of the drum includes a friction resistance rotational motion damper that resists but not prevent the rotational motion of the drum within the diameter-matching cylindrical bore.

This spring is prestressed and torqued so as to bias the decorative housing for the calculator to assume the open viewing position of use. Therefore, the pivoting members, the bore, the drum, and the spring cooperate to provide the slow gliding rotational motion of the upper and lower parts alternately between the open and closed positions.

The rotational motion damper has a coating of friction-producing grease disposed on the outer surface of the drum. The grease is a layer disposed between the outer surface of the drum and the inner surface of the diameter-matching cylindrical bore.

Preferably the outer surfaces of the decorative housing for the calculator are curved.

In the closed position of the decorative housing for the calculator, the front edges and the rear edges of the inner surfaces of the upper and lower parts of the decorative housing are aligned with each other.

Conversely, in the open position of the decorative housing for the calculator, the front and the rear edges of the upper part inner surface are disposed rearwardly of the respective front and rear edges of the lower part.

The curved outer surfaces of the decorative housing for the calculator cooperate in the closed position form the decorative housing for the calculator into a double crescent shape.

The calculator within the decorative housing has a visual display and a photocell disposed on the front portion of the inner surface of the lower part of the decorative housing.

The display and photocell are alternately revealed and hidden when the upper and lower part move to the open and closed positions.

The calculator has a user-touchable data-entry key pad disposed on the outer surface of the upper part. This key pad has a finger-depressible spring-mounted latch which automatically locks the calculator in the closed position. This latch is released by finger pressure so as to permit the torsion coil spring to urge the calculator in to the open position.

Therefore, the decorative housing is a two-piece user openable object capable of moving with a slow gliding motion between an open position and a closed position.

BRIEF DESCRIPTION OF THE DRAWINGS

The present invention can best be understood in conjunction with the accompanying drawings, in which:

FIGS. 1A and 1B show two views of the calculator of the present invention when closed, wherein FIG. 1A is a top elevation view of said calculator and FIG. 1B is a side elevation view of said calculator;

FIGS. 2A and 2B show two views of the calculator depicted in FIG. 1 when deployed, wherein FIG. 2A is a top elevation view of said calculator and FIG. 2B is a side elevation view of said calculator;

DETAILED DESCRIPTION OF THE PREFERRED EMBODIMENTS

FIG. 1A shows the top view of a decorative housing, such as calculator 1 with top housing 2, keyboard 3, and keyboard border frame 6.

Figure 4:
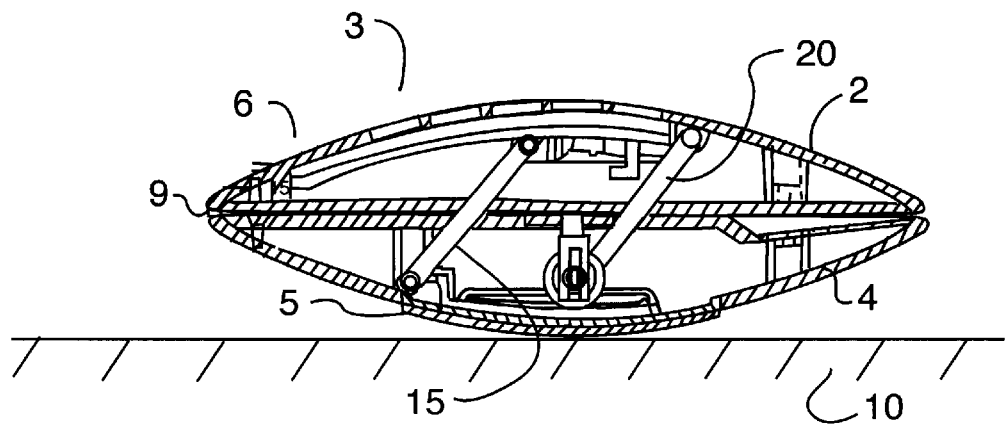
FIG. 4 is a side phantom view of the calculator depicted in FIG. 1 when the calculator is in its closed position.

By viewing the side view of FIG. 1B, the circular arc contour of top housing 2 as well as bottom housing 4 is revealed. Two elastomeric strips 5 near each side edge protect the desk surface on which the calculator rests. In this FIG. 1B, calculator 1 is closed. It is weight balanced such that it rests horizontally on its elastomeric strips 5. If one end of calculator 1 is pressed down and then released, it oscillates in a quick rocking motion for a short period of time and then comes to rest as depicted in FIG. 4.

To open the top cover housing 2 of calculator 1, if one presses keyboard 3 in the vicinity of the top row of keys, the curved keyboard will pivot slightly inward against spring pressure to release a latch 30, which normally keeps top housing 2 in registration with the bottom housing 4.

Calculator 1 is opened by release of a pair of latches 30.

Figure 7:
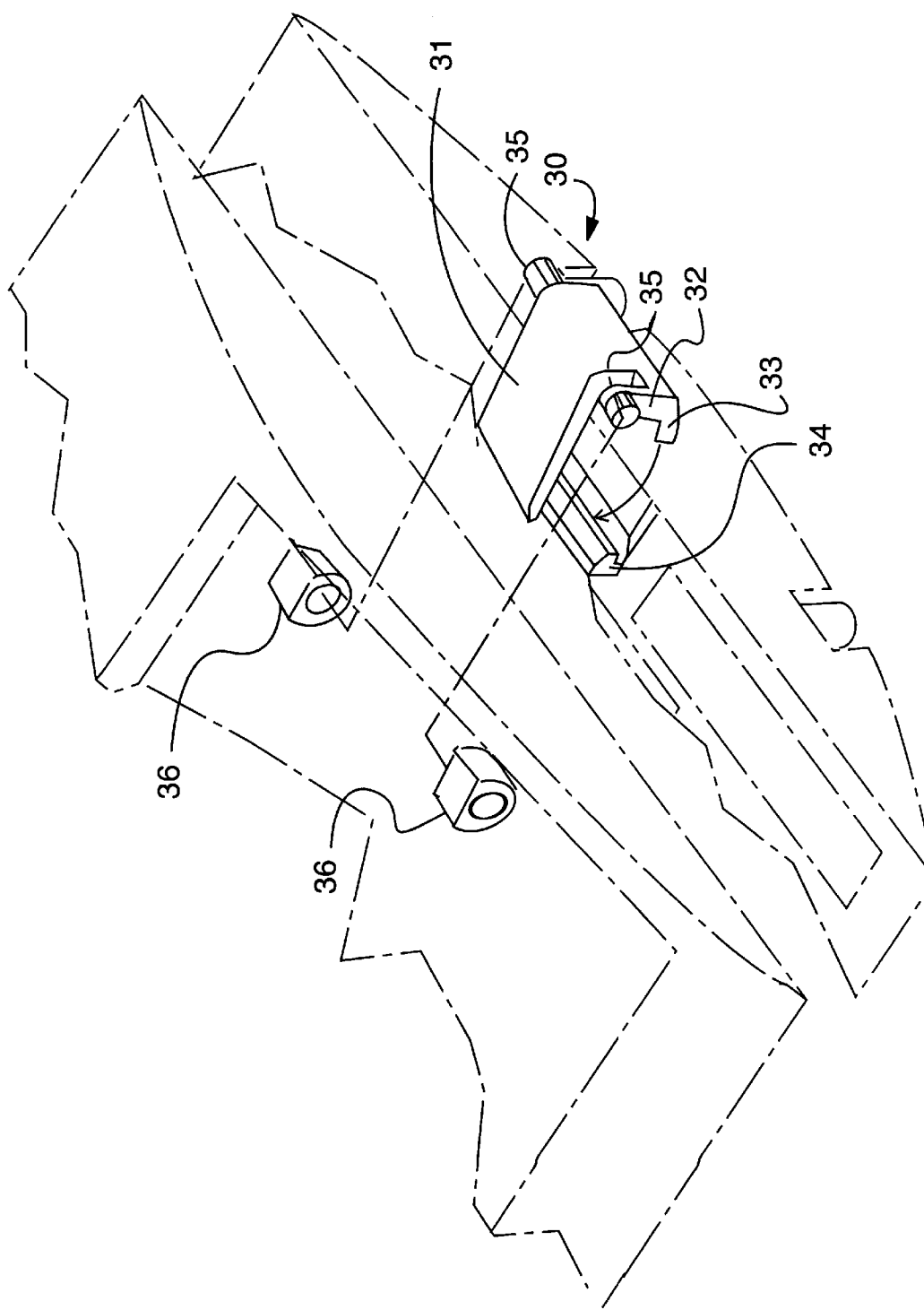

As shown in FIG. 7, latch 30 includes activator member 31 below the top row of keyboard 3, which activator member 31 is depressed down when any key of the top row of the key pads of keyboard 3 is depressed down and pushes down against a planar member (not shown) which in turn pushes against activator 31 of latch 30.

The downward movement of activator member 31 causes male member 32 to pivot outward, about axles 35 within hollow bearings 36, thereby releasing tongue 33 from engagement with female member 34. Spring pressure is released, causing top housing 2 and bottom housing 4 of calculator 1 to separate from each other and to open up calculator 1 to the open position as in FIGS. 2B and 5. A similar mirror image latch (not shown) is located on the opposite side of calculator 1.

Upon release of latch 30, an unexpected automatic slow motion progresses which moves top housing 2 up and then down while also moving it toward the user.

The unbalanced weight of top housing 2 causes entire calculator 1 to rotate on bottom housing 4 until the stable end of the deployed configuration is reached. This is shown in FIGS. 2A and 2B.

In the top view of calculator 1 as depicted in FIG. 2A, liquid crystal display 7 and solar cells 8 are now in view. The total length of calculator 1 has been increased by about one third in this deployed state.

In FIG. 2B, front elastomeric strip 9 is shown in contact with desk surface 10. This is a very stable configuration which keeps calculator 1 steady, even with rough use of keyboard 3. Calculator 1 is re-closed manually by a simple one-handed operation. The top edge of bottom housing 4 and the bottom edge of top housing 2 are forced toward each other; so this aligns the two halves 2, 4. A final press down latches two housing halves 2, 4 together which returns calculator 1 to its closed position as depicted in FIGS. 1A, 1B and 4.

Figure 3:
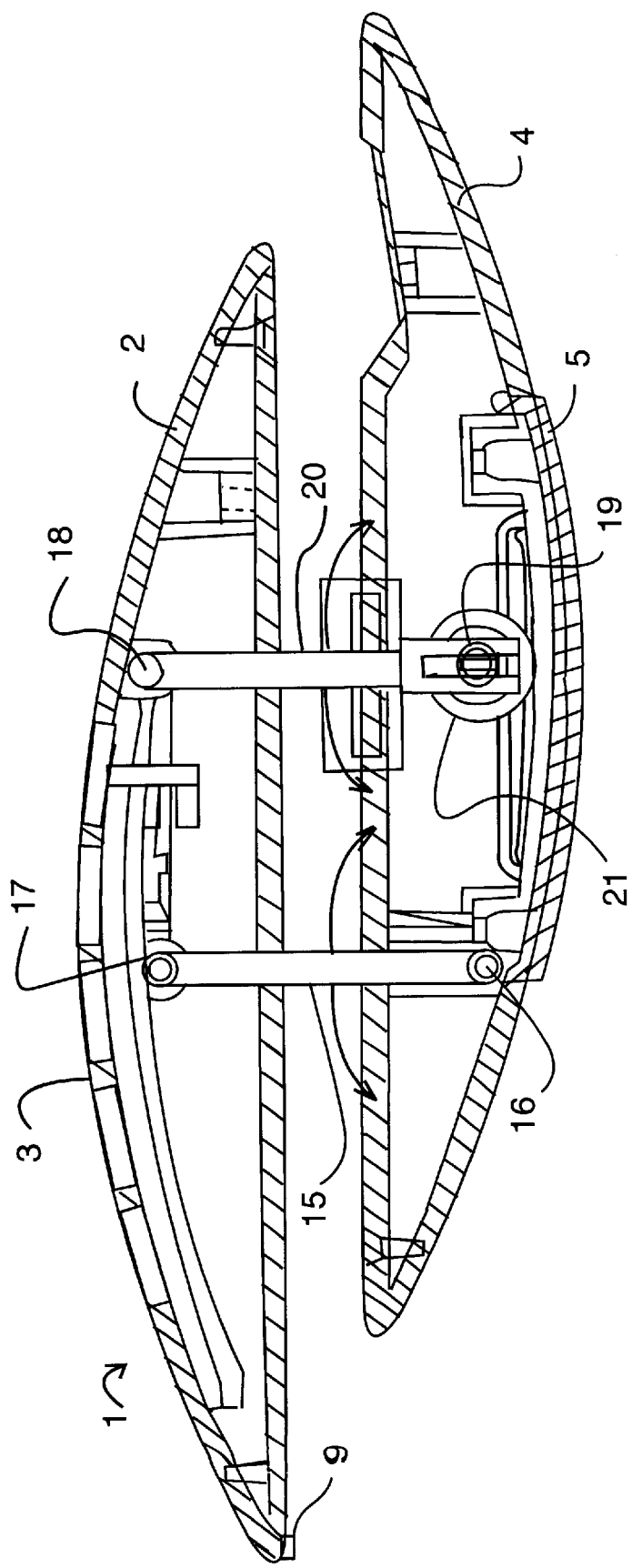
FIG. 3 is a side phantom view of the calculator depicted in FIG. 1 showing pivoted planes during deployment of the calculator.

FIG. 3 reveals the two pivotable planar members 15 and 20 which constrain the motion of top housing 2 with respect to bottom housing 4. Pivotable planar member 15 pivots at pivot points 17 and 16 while pivotable planar member 20 pivots at pivot points 18 and 19 thereby defining a parallelogram mechanism. The position depicted in FIG. 3 is half way between the closed and deployed positions. In another embodiment, pivotable planar members 15, 20 could be pairs of pivotable rods separated by gaps (not shown in the drawings).

Cylindrical housing 21 encloses the mechanism which powers the opening motion of the calculator 1.

FIG. 4 is a phantom side view of calculator 1 which shows the position of pivotable planar members 15 and 20 when calculator 1 is in the closed position.

Figure 5:
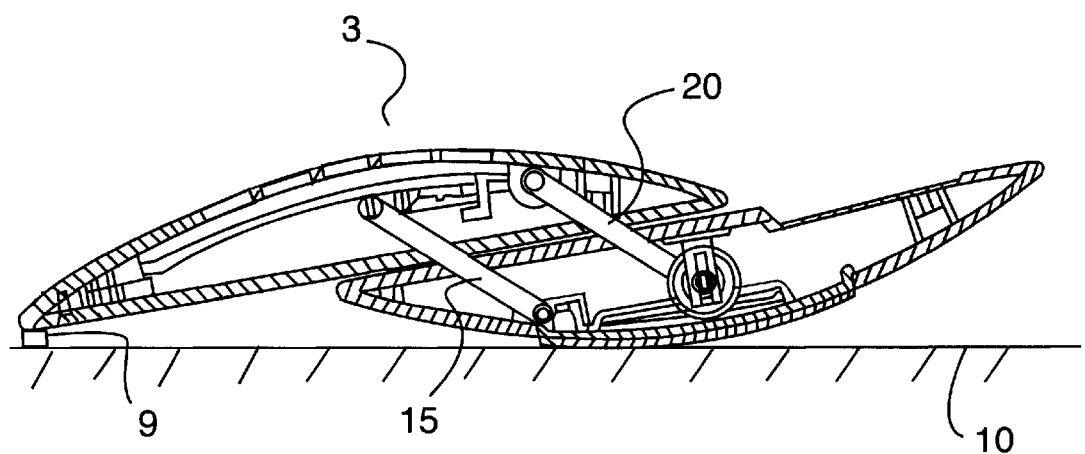
FIG. 5 is a side phantom view of the calculator depicted in FIG. 1 when the calculator is deployed.

FIG. 5 is phantom side view of calculator 1 showing pivotable planar members 15 and 20 when calculator 1 is in the deployed position.

Figure 6:
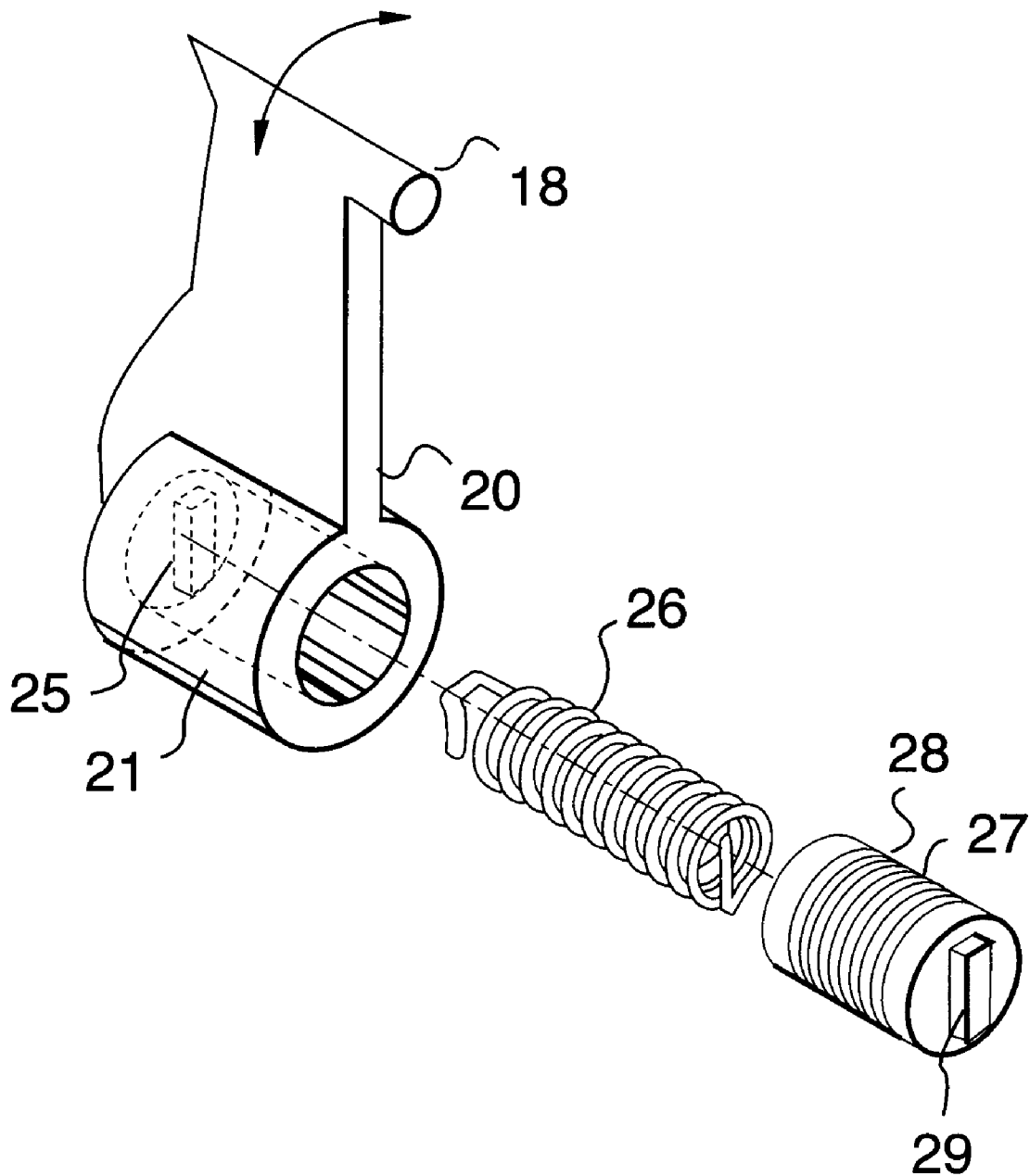
FIG. 6 is a perspective view of the torsion spring drive detail utilized in the calculator depicted in FIGS. 1–5; and, FIG. 7 is a perspective close-up detail view in partial cross section of the latch portion of the calculator.

FIG. 6 is a detail of the mechanism which powers the deployment motion of calculator 1. Prestressed torsion coil spring 26 is engaged at one end by boss groove 25 formed within housing 21 which is molded as part of pivotable planar member 20. The opposite end of torsion spring 26 engages a boss groove (not shown) within drum 27, which is prevented from turning in lower housing 4 by boss groove 29.

Spring 26 is torqued prior to its insertion into housing 21 so as to create a source of energy to allow for calculator 1 to assume the deployed position from its closed position as described above. The inside of housing 21 forms a bearing surface around drum 27.

In a damper mode, the outer surface of drum 27 is covered with a thick grease 28; this slows down the motion by providing a fluid shear counter-torque which is a function of the speed of rotation. In this manner, a relatively constant (slow and graceful) motion of housing halves 2 and 4 is achieved.

It is the layer of grease 28 between the inner surface of housing 21 and the outer surface of drum 27 which provides the slow motion action. During the manual closing action, energy is stored in spring 26.

It is further noted that other modifications may be made to the present invention without departing from the scope of the invention, as noted in the appended Claims.

I claim:

1. A decorative housing device for useful articles, comprising:
    (a) a body having a longitudinal dimension, said body being divided along said longitudinal dimension into an upper part and a separate lower part, said upper and lower parts each having respective outer surfaces and respective parallel mutually opposing inner surfaces in separable contact with one another; said inner surfaces respectively having a front portion terminating in a front edge and a rear portion terminating in a rear edge;
    (b) a pair of elongated pivoting members in parallel disposition relative to each other, said pivoting members each rotatably connected within said upper and said lower parts; and wherein one of said pivoting members is a driven member and said other pivoting member is a driver; said driver pivoting member being provided with spring means and motion damping means mounted to said driver pivoting member at said rotatable connection of said driver pivoting member with said lower part of said body of said decorative housing;
    (c) the upper and lower parts being moveable with a slow gliding rotational motion, wherein accelerations are relatively small and velocity is relatively low and substantially constant through most of the travel of said upper and lower parts relative to each other, wherein further rotational motion is about said pivotable members; said rotational motion comprising a component of longitudinal displacement and a component of vertical displacement; said rotational motion being between alternate open and closed positions of said decorative housing; said opposing inner surfaces remaining parallel to each other during said rotational motion; and
    (d) in the closed position said inner surface of said upper part covers substantially all of said inner surface of said lower part; and
    (e) in the open position said inner surface of said upper part covers less than substantially all of said inner surface of said lower part; and
    (f) the spring means urging said upper and lower parts into the open position wherein; said decorative housing having latch means for releasably latching said decorative housing in the closed position.

2. The decorative housing device of claim 1 wherein said spring means comprises a torsion coil mounted in a drum having a hollow interior for accommodating said spring; said drum being mounted rotatably within a diameter-matching cylindrical bore comprising said lower end of said driver pivoting member; said bore having an inner surface; said drum having an outer surface in close proximity to said inner surface of said cylindrical bore; said outer surface of said drum being provided with friction resistance rotational motion damping means for resisting but not preventing said rotational motion of said drum within said diameter-matching cylindrical bore; said spring being prestressed and torqued so as to bias said decorative housing to assume the open position; wherein said pivoting members, said bore, said drum, and said spring cooperate to provide said slow gliding rotational motion of said upper and lower parts alternately between the open and closed positions.

3. The decorative housing device of claim 2 wherein said rotational motion damping means comprises a coating of friction-producing grease disposed on said outer surface of said drum; said grease comprising a layer disposed between said outer surface of said drum and said inner surface of said diameter-matching cylindrical bore.

4. The decorative housing device as in claim 1 wherein said latch means comprises a activator member responsive to force from above, said activator member having a rotatable male member having a tongue engagable within a female member, wherein rotation of said male member releases said tongue from said female member, thereby releasing said top housing from a position adjacent said bottom housing.

5. The decorative housing device of claim 1 wherein said outer surfaces of said decorative housing are curved; and
    in the closed position of said decorative housing, said front edges and said rear edges of said inner surfaces of said upper and lower parts are aligned with each other; and
    in the open position of said decorative housing, said front and said rear edges of said upper part inner surface are disposed rearwardly of said respective front and rear edges of said lower part.

6. The decorative housing device of claim 5 wherein said curved outer surfaces of said decorative housing cooperate in the closed position to form said decorative housing into a double crescent shape.

7. The decorative housing device of claim 6 wherein said decorative housing comprises a calculator, said calculator having a display and photocell disposed on said front portion of said inner surface of said lower part, said display and photocell being alternately revealed and hidden when said upper and lower part move to the open and closed positions; the calculator having a user-touchable data-entry key pad disposed on said outer surface of said upper part; said key pad having a finger-depressible spring-mounted latch, said latch automatically locking said calculator in the closed position; said latch being released by finger pressure so as to permit said torsion coil spring to urge said calculator in to the open position.

8. A two-piece user openable object decorative housing device capable of moving with a slow gliding motion between an open position and a closed position, comprising:
    (a) a body having a longitudinal dimension, said body being divided along said longitudinal dimension into an upper part and a separate lower part, said upper and lower parts each having respective outer surfaces and respective parallel mutually opposing inner surfaces in separable contact with one another; said inner surfaces respectively having a front portion terminating in a front edge and a rear portion terminating in a rear edge;
    (b) a pair of elongated pivoting members in parallel disposition relative to each other, said pivoting members each rotatably connected within said upper and said lower parts; and wherein one of said pivoting members is a driven member and said other pivoting member is a driver; said driver pivoting member being provided with spring means and motion damping means mounted to said driver pivoting member at said rotatable connection of said driver pivoting member with said lower part of said body of said two-piece user openable object;
    (c) the upper and lower parts being moveable with a slow gliding rotational motion about said pivoting rods; said rotational motion comprising a component of longitudinal displacement and a component of vertical displacement; said rotational motion being between alternate open and closed positions of said two-piece user openable object; said opposing inner surfaces remaining parallel to each other during said rotational motion; and (d) in the closed position said inner surface of said upper part covers substantially all of said inner surface of said lower part; and (e) in the open position said inner surface of said upper part covers less than substantially all of said inner surface of said lower part; and (f) the spring means urging said upper and lower parts into the open position wherein; said two-piece user openable object having latch means for releasably latching said two-piece user openable object in the closed position.

9. The decorative housing device of claim 8 wherein said spring means comprises a torsion coil mounted in a drum having a hollow interior for accommodating said spring; said drum being mounted rotatably within a diameter-matching cylindrical bore comprising said lower end of said driver pivoting member; said bore having an inner surface; said drum having an outer surface in close proximity to said inner surface of said cylindrical bore; said outer surface of said drum being provided with friction resistance rotational motion damping means for resisting but not preventing said rotational motion of said drum within said diameter-matching cylindrical bore; said spring being prestressed and torqued so as to bias said two-piece user openable object to assume the open position; wherein said pivoting members, said bore, said drum, and said spring cooperate to provide said slow gliding rotational motion of said upper and lower parts alternately between the open and closed positions.

10. The decorative housing device of claim 9 wherein said rotational motion damping means comprises a coating of friction-producing grease disposed on said outer surface of said drum; said grease comprising a layer disposed between said outer surface of said drum and said inner surface of said diameter-matching cylindrical bore.

11. The decorative housing device as in claim 8 wherein said latch means comprises a activator member responsive to force from above, said activator member having a rotatable male member having a tongue engagable within a female member, wherein rotation of said male member releases said tongue from said female member, thereby releasing said top housing from a position adjacent said bottom housing.

12. The decorative housing device of claim 8 wherein said outer surfaces of said two-piece user openable object are curved; and,
   in the closed position of said two-piece user openable object, said front edges and said rear edges of said inner surfaces of said upper and lower parts are aligned with each other; and,
   in the open position of said two-piece user openable object, said front and said rear edges of said upper part inner surface are disposed rearwardly of said respective front and rear edges of said lower part.

13. The decorative housing device of claim 12 wherein said curved outer surfaces of said two-piece user openable object cooperate in the closed position to form said two-piece user openable object into a double crescent shape.

14. The decorative housing device of claim 8 wherein said two-piece user openable object comprises a calculator, said calculator having a display and photocell disposed on said front portion of said inner surface of said lower part, said display and photocell being alternately revealed and hidden when said upper and lower part move to the open and closed positions;
   the calculator having a user-touchable data-entry key pad disposed on said outer surface of said upper part; said key pad having a finger-depressible spring-mounted latch, said latch automatically locking said calculator in the closed position; said latch being released by finger pressure so as to permit said torsion coil spring to urge said calculator into the open position.

\* \* \* \* \*